(12) United States Patent
Xue et al.

(10) Patent No.: US 9,552,114 B2
(45) Date of Patent: Jan. 24, 2017

(54) TOUCH PANEL

(71) Applicant: Shenzhen China Star Optoelectronics Technology Co., Ltd., Shenzhen, Guangdong (CN)

(72) Inventors: Jingfeng Xue, Guangdong (CN); Xin Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 114 days.

(21) Appl. No.: 14/440,659

(22) PCT Filed: Jan. 16, 2015

(86) PCT No.: PCT/CN2015/070831
§ 371 (c)(1),
(2) Date: May 5, 2015

(87) PCT Pub. No.: WO2016/106861
PCT Pub. Date: Jul. 7, 2016

(65) Prior Publication Data
US 2016/0342238 A1  Nov. 24, 2016

(30) Foreign Application Priority Data
Dec. 30, 2014  (CN) .......................... 2014 1 0842861

(51) Int. Cl.
*G06F 3/044*  (2006.01)
*G02F 1/1362*  (2006.01)

(52) U.S. Cl.
CPC ......... *G06F 3/044* (2013.01); *G02F 1/136209* (2013.01); *G02F 1/136227* (2013.01); *G06F 2203/04103* (2013.01)

(58) Field of Classification Search
CPC ............ G06F 3/044; G06F 2203/04103; G02F 1/136209; G02F 1/136227; G02F 1/1368; G02F 2001/13685; H01L 27/1288; H01L 29/78618; H01L 29/78633
See application file for complete search history.

(56) References Cited

U.S. PATENT DOCUMENTS 5,773,844 A * 6/1998 Kawamura ........... H01L 29/513
257/411
6,335,772 B1 * 1/2002 Sato .................. G02F 1/136209
349/110

(Continued)

*Primary Examiner* — Tom Sheng
(74) *Attorney, Agent, or Firm* — Andrew C. Cheng

(57) ABSTRACT

The disclosure is related to a touch panel including a substrate; a low-temperature poly-silicon layer, a first isolating layer, a gate and a second isolating layer arranged in sequence and disposed on a surface of the substrate; a source and a drain disposed on the second isolating layer, the source and the drain disposed separately and respectively connected to the low-temperature poly-silicon layer through a through hole; a planar layer disposed on the source, the drain and the second isolating layer, the planar layer having a first via corresponding to the drain; a filling part filling the first via and the filling part electrically connected to the drain; a third isolating layer disposed on the planar layer, the third isolating layer having a second via corresponding to the filling part; a pixel electrode disposed on the third isolating layer and electrically connected to the filling part through the second via.

11 Claims, 1 Drawing Sheet

(56) References Cited

U.S. PATENT DOCUMENTS

| | | | |
|---|---|---|---|
| 6,432,734 B1* | 8/2002 | Chen | H01L 27/1214 |
| | | | 257/E27.111 |
| 6,569,717 B1* | 5/2003 | Murade | G02F 1/136213 |
| | | | 257/296 |
| 7,932,979 B2* | 4/2011 | Yang | G02F 1/136213 |
| | | | 349/140 |
| 8,518,729 B1* | 8/2013 | Dai | H01L 29/78633 |
| | | | 257/E21.062 |
| 9,425,223 B1* | 8/2016 | Wang | H01L 21/77 |
| 2002/0081761 A1* | 6/2002 | Chen | H01L 27/1214 |
| | | | 438/30 |
| 2002/0101398 A1* | 8/2002 | Fujita | G09G 3/3659 |
| | | | 345/90 |
| 2003/0036221 A1* | 2/2003 | Song | G02F 1/13458 |
| | | | 438/141 |
| 2004/0104388 A1* | 6/2004 | Hung | H01L 27/124 |
| | | | 257/59 |
| 2008/0111132 A1* | 5/2008 | Wang | H01L 27/1288 |
| | | | 257/59 |
| 2008/0121875 A1* | 5/2008 | Kim | H01L 51/052 |
| | | | 257/40 |
| 2013/0161625 A1* | 6/2013 | Ku | H01L 27/1288 |
| | | | 257/59 |
| 2015/0303150 A1* | 10/2015 | Choi | H01L 21/77 |
| | | | 257/72 |
| 2016/0252996 A1* | 9/2016 | Jiang | G06F 3/0418 |

\* cited by examiner

TOUCH PANEL

CROSS REFERENCE TO RELATED APPLICATIONS

This application claims the benefit of, and priority to, Chinese Patent Application No. 201410842861.4, filed Dec. 30, 2014, titled "Touch Panel", the entire contents of which are incorporated by reference herein in its entirety.

BACKGROUND OF THE INVENTION

1. Field of the Invention

The disclosure is related to touch technology field, and more particular to a touch panel.

2. The Related Arts

A touch device is a common device because of the characteristics of low power consumption, small size, light weight and so on. Therefore it becomes customer's favorite product. The touch device usually includes a touch panel. Since the low temperature ploy-silicon (LTPS) thin film transistor (TFT) may make the touch panel to have higher resolution, lower power consumption, higher mobility and lower preparation temperature, it has been widely studied and applied. In the touch panel, there is a distance between the pixel electrode and the drain, and the pixel electrode is connected to the drain of the thin film transistor through a via. Under normal circumstances, a separator (such as an isolating layer or a planar layer) between the pixel electrode and the drain is thicker such that a deepness of the via between the pixel electrode and the drain is deeper. Therefore, when the pixel electrode is connected to the drain through the via, it is easy for the pixel electrode to break line and drop out easily, thereby decreasing a yield of the touch panel.

SUMMARY OF THE INVENTION

The disclosure provides a touch panel which includes:

a substrate;

a low-temperature poly-silicon layer, a first isolating layer, a gate and a second isolating layer arranged in sequence and disposed on a surface of the substrate;

a source and a drain, the source and the drain disposed on the second isolating layer, the source and the drain disposed separately and the source and the drain respectively connected to the low-temperature poly-silicon layer through a through hole;

a planar layer disposed on the source, the drain and the second isolating layer, the planar layer having a first via corresponding to the drain;

a filling part filling the first via and the filling part electrically connected to the drain;

a third isolating layer disposed on the planar layer, the third isolating layer having a second via corresponding to the filling part; and a pixel electrode disposed on the third isolating layer and electrically connected to the filling part through the second via.

In one embodiment, the filling part comprises a first portion and a second portion connected to the first portion; the first portion passes through the first via to electrically connect to the drain; the second portion is disposed on the planar layer and covers the first via.

In one embodiment, the touch panel further comprises a light shading layer, the light shading layer is disposed on the surface of the substrate, the low-temperature poly-silicon layer is disposed on the surface of the substrate through the light shading layer, and the low-temperature poly-silicon layer is disposed on a middle portion of the light shading layer.

In one embodiment, the touch panel further comprises touch receiving lines and touch emitting lines. The touch receiving lines receive a detecting signal to detect a touch action on the touch panel and a location of the touch action. The touch emitting lines transmit a signal corresponding to the touch action and the touch location to a chip. At least one of the touch receiving lines and the touch emitting lines comprises a first transparent guide wire and a metal wire. The metal wire is disposed on the planar layer. The metal wire is electrically connected to the first transparent guide wire.

In one embodiment, a material of the filling part is metal, and the filling part and the metal wire are formed at the same time.

The effect of the disclosure different from the current technique is that the first via is disposed on the planar layer, the filling part is filled in the first via, the filling part is electrically connected to the drain, the second via is disposed on the third isolating layer, and the second via corresponds to the filling part. When the pixel electrode is connected to the drain, the pixel electrode is only electrically connected to the filling part through the second via. On the other hand, the first via is disposed on the planar layer and the filling part is filled in the first via so as to decrease a depth between the pixel electrode and the drain, such that when the pixel electrode is electrically connected to the drain, the pixel electrode does not break line and drop out easily, thereby increasing a yield of the touch panel. Further, since the material of the filling part is metal or alloy, the resistance is lower than the pixel electrode of the transparent metal oxide. Therefore, compared to the pixel electrode directly connected to the drain in the current technique, the resistance between the pixel electrode and the drain is decreased when the pixel electrode is connected to the drain through the filling part in the disclosure.

The disclosure further provides a touch panel which includes:

a substrate;

a low-temperature poly-silicon layer and a first isolating layer arranged in sequence and disposed on a surface of the substrate;

two first type heavy doping regions disposed on the first isolating layer, and the two first type heavy doping regions disposed separately;

a second isolating layer disposed on the first type heavy doping regions;

a gate and a third isolating layer arranged in sequence and disposed on the second isolating layer;

a source and a drain, the source and the drain disposed on the third isolating layer, the source and the drain disposed separately and the source and the drain respectively connected to the first type heavy doping regions through a through hole;

a planar layer disposed on the source, the drain and the third isolating layer, the planar layer having a first via corresponding to the drain;

a filling part filling the first via and the filling part electrically connected to the drain;

a fourth isolating layer disposed on the planar layer, the fourth isolating layer having a second via corresponding to the filling part; and a pixel electrode disposed on the fourth isolating layer and electrically connected to the filling part through the second via.

In one embodiment, the filling part comprises a first portion and a second portion connected to the first portion; the first portion passes through the first via to electrically connect to the drain; the second portion is disposed on the planar layer and covers the first via.

In one embodiment, the touch panel further comprises a light shading layer; the light shading layer is disposed on the surface of the substrate; the low-temperature poly-silicon layer is disposed on the surface of the substrate through the light shading layer; the low-temperature poly-silicon layer is disposed on a middle portion of the light shading layer.

In one embodiment, the touch panel further comprises touch signal lines; the touch signal lines detect a touch action on the touch panel and a location of the touch action; the touch signal lines transmit a signal corresponding to the touch action and the touch location to a chip; at least one of the touch signal lines comprises a first transparent guide wire and a metal wire; the metal wire is disposed on the planar layer; the metal wire is electrically connected to the first transparent guide wire.

In one embodiment, a material of the filling part is metal, and the filling part and the metal wire are formed at the same time.

In one embodiment, the touch panel further comprises a first type light doping region; the first type light doping region is disposed on the first isolating layer and disposed between the two first type heavy doping regions.

The effect of the disclosure different from the current technique is that the first via is disposed on the planar layer, the filling part is filled in the first via, the filling part is electrically connected to the drain, the second via is disposed on the fourth isolating layer, and the second via corresponds to the filling part. When the pixel electrode is connected to the drain, the pixel electrode is only electrically connected to the filling part through the second via. On the other hand, the first via is disposed on the planar layer and the filling part is filled in the first via so as to decrease a depth between the pixel electrode and the drain, such that when the pixel electrode is electrically connected to the drain, the pixel electrode does not break line and drop out easily, thereby increasing a yield of the touch panel. Further, since the material of the filling part is metal or alloy, whose resistance is lower than the pixel electrode of the transparent metal oxide. Therefore, compared to the pixel electrode directly connected to the drain in the current technique, the resistance between the pixel electrode and the drain is decreased when the pixel electrode is connected to the drain through the filling part in the disclosure.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION OF THE PREFERRED EMBODIMENTS

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
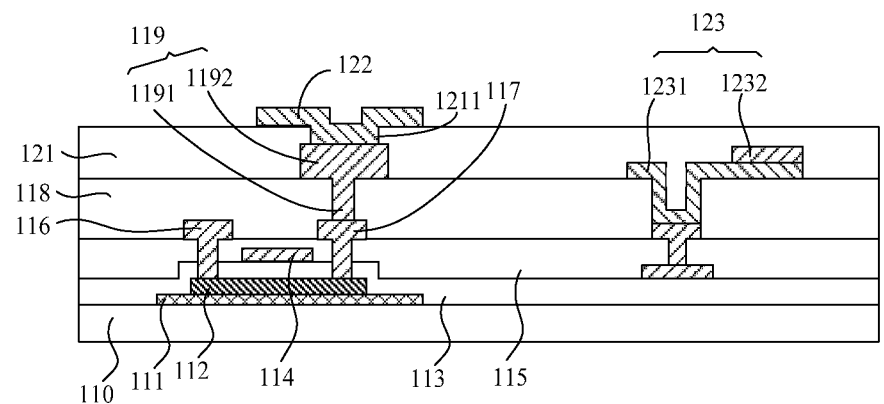
FIG. 1 is a schematic cross section view of the touch panel according to the embodiment of the disclosure.

Refer to FIG. 1. FIG. 1 is a schematic cross section view of the touch panel according to the embodiment of the disclosure. The touch panel 100 includes a substrate 110, a low-temperature poly-silicon layer 112, a first isolating layer 113, a gate 114 and a second isolating layer 115 arranged in sequence and disposed on a surface of the substrate 110. The touch panel 100 further includes a source 116 and a drain 117. The source 116 and the drain 117 disposed on the second isolating layer 115. The source 116 and the drain 117 are disposed separately and the source 116 and the drain 117 are respectively connected to the low-temperature poly-silicon layer 112 through a through hole. The touch panel 100 further includes a planar layer 118. The planar layer 118 is disposed on the source 116, the drain 117 and the second isolating layer 115. The planar layer 118 has a first via 1181 corresponding to the drain 117. The touch panel 100 further includes a filling part 119. The filling part 119 fills the first via 1181 and the filling part 119 is electrically connected to the drain 117. The touch panel 100 further includes a third isolating layer 121 and a pixel electrode 122. The third isolating layer 121 is disposed on the planar layer 118. The third isolating layer 121 has a second via 1211 corresponding to the filling part 119. The pixel electrode 122 is disposed on the third isolating layer 121 and electrically connected to the filling part 119 through the second via 1211. The material of the pixel electrode 122 is different from the material of the filling part 119.

The filling part 119 includes a first portion 1191 and a second portion 1192 connected to the first portion 1191. The first portion 1191 passes through the first via 1811 to electrically connect to the drain 117. The second portion 1192 is disposed on the planar layer 118 and covers the first via 1181. In the embodiment, the shape of the filling part 119 is "T". The material of the filling part 119 is metal or alloy. For example, the material of the filling part 119 is selected from one of Cu, W, Cr, Al and combination thereof.

The touch panel 100 further comprises a light shading layer 111. The light shading layer 111 is disposed on the surface of the substrate 110, the low-temperature poly-silicon layer 112 is disposed on the surface of the substrate 110 through the light shading layer 111, and the low-temperature poly-silicon layer 112 is disposed on a middle portion of the light shading layer 111. In the embodiment, the low-temperature poly-silicon layer 112, the first isolating layer 113, the gate 114, the second isolating layer 115, the source 116 and the drain 117 are combined to form a low-temperature poly-silicon thin film transistor, and the light shading layer 111 is used to avoid a light leakage of the low-temperature poly-silicon thin film transistor on the touch panel 100.

In the embodiment, the touch panel 100 is a mutual capacitance touch panel. The touch panel 100 further includes touch receiving lines 123 and touch emitting lines (not shown). The touch receiving lines 123 receive a detecting signal to detect a touch action on the touch panel 100 and a location of the touch action, and the touch emitting lines transmit a signal corresponding to the touch action and the touch location to a chip, such that the chip performs an operation corresponding to the touch action and the location of the touch action. At least one of the touch receiving lines 123 and the touch emitting lines includes a first transparent guide wire 1231 and a metal wire 1232. The metal wire 1232 is disposed on the planar layer 118. The metal wire 1232 is electrically connected to the first transparent guide wire 1231. The material of first transparent guide wire 1231 is a transparent metal oxide and has conductivity. The first transparent guide wire 1231 may include one of Indium-Tin Oxide, Indium-Zinc Oxide, Indium Oxide, Zinc Oxide or any combination thereof. Comparing the conductively of the first transparent guide wire 1231 whose material is metal oxide with the conductively of the metal, the conductively of the first transparent guide wire 1231 is worse. Therefore, on the basis of maintaining the transparency, the signal lines is formed by electrically connecting the metal wire 1232 and the first transparent guide wire 1231 so as to increase their conductively.

The material of the filling part 119 is metal; the filling part 119 and the metal wire 1232 are formed at the same. On the other hand, the filling part 119 and the metal wire 1232 are formed in the same process so as to save the manufacturing procedure of the touch panel 100. The filling part 119 and the metal wire 1232 may be formed in the following manner. First, a metal layer is disposed on the planar layer 118, and then the metal layer is patterned to form the filling part 119 and the metal wire 1232.

In the embodiment, the substrate 110 may be a glass substrate. It should be understood that the substrate 110 also may be a plastic substrate or an isolating substrate in other embodiments. The material of the first isolating layer 113, the second isolating layer 115 and the third isolating layer 121 may be one of silicon oxide layer, silicon nitride layer, silicon oxynitride layer and combination thereof.

The surface of the substrate 110 further includes a buffer layer. The buffer layer is used to buffer a stress in the process of making the other structures of the touch panel 100 on the substrate 110 so as to avoid damaging or breaking the substrate 110. The material of the buffer layer is selected from one of silicon oxide layer, silicon nitride layer, silicon oxynitride layer and combination thereof. At this time, the light shading layer 111, the low-temperature poly-silicon layer 112, the first isolating layer 113 and other layers are disposed on the surface of the substrate 110 through the buffer layer.

The effect of the disclosure different from the current technique is that in the touch panel 100 of the disclosure, the first via 1181 is disposed on the planar layer 118, the filling part 119 is filled in the first via 1181, the filling part 119 is electrically connected to the drain 117, the second via 1211 is disposed on the third isolating layer 121, and the second via 1211 corresponds to the filling part 119. When the pixel electrode 122 is connected to the drain 117, the pixel electrode 122 is only electrically connected to the filling part 119 through the second via 1211. On the other hand, the first via 1181 is disposed on the planar layer 118 and the filling part 119 is filled in the first via 1181 so as to decrease a depth between the pixel electrode 122 and the drain 117, such that when the pixel electrode 122 is electrically connected to the drain 117, the pixel electrode 122 does not break line and drop out easily, thereby increasing a yield of the touch panel 100. Further, since the material of the filling part 119 is metal or alloy, whose resistance is lower than the pixel electrode 122 of the transparent metal oxide. Therefore, compared to the pixel electrode directly connected to the drain in the current technique, the resistance between the pixel electrode 122 and the drain 117 is decreased when the pixel electrode 122 is connected to the drain 117 through the filling part 119 in the disclosure.

Figure 2:
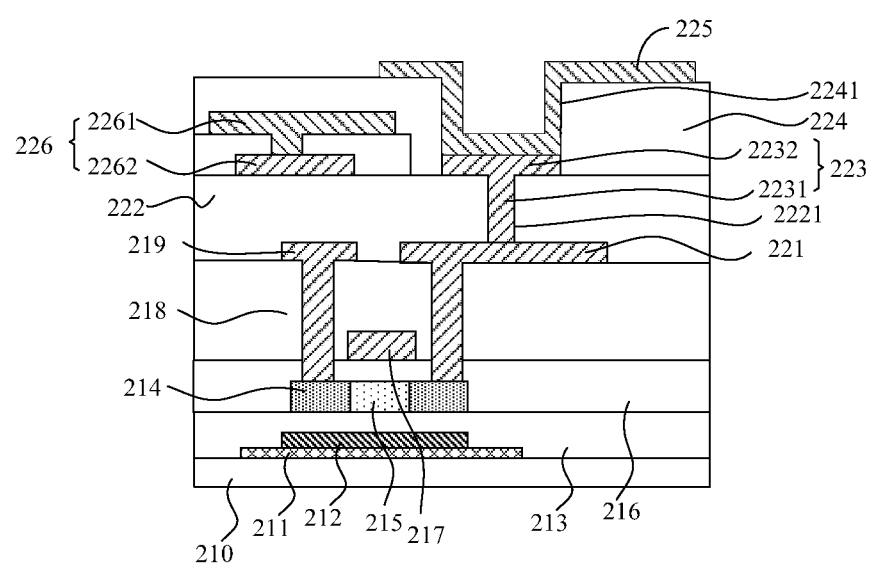
FIG. 2 is a schematic cross section view of the touch panel according to another embodiment of the disclosure.

Refer to FIG. 2. FIG. 2 is a schematic cross section view of the touch panel according to another embodiment of the disclosure. The touch panel 200 includes a substrate 210, a low-temperature poly-silicon layer 212 and a first isolating layer 213 arranged in sequence and disposed on a surface of the substrate 210. The touch panel 200 further includes two first type heavy doping regions 214 disposed on the first isolating layer 213, and the two first type heavy doping regions 214 are disposed separately. The touch panel 200 further includes a second isolating layer 216, a gate 217 and a third isolating layer 218 arranged in sequence and disposed on the second isolating layer 216. The second isolating layer 216 is disposed on the first type heavy doping regions 214. The touch panel 200 further includes a source 219 and a drain 221. The source 219 and the drain 221 disposed on the third isolating layer 218. The source 219 and the drain 221 are disposed separately and the source 219 and the drain 221 are respectively connected to the first type heavy doping regions 214 through a through hole. The touch panel 200 further includes a planar layer 222. The planar layer 222 is disposed on the source 219, the drain 221 and the third isolating layer 218. The planar layer 222 has a first via 2221 corresponding to the drain 221. The touch panel 200 further includes a filling part 223. The filling part 223 fills the first via 2221 and the filling part 223 is electrically connected to the drain 221. The touch panel 200 further includes a fourth isolating layer 224 and a pixel electrode 225. The fourth isolating layer 224 is disposed on the planar layer 222. The fourth isolating layer 224 has a second via 2241 corresponding to the filling part 223. The pixel electrode 225 is disposed on the fourth isolating layer 224 and electrically connected to the filling part 223 through the second via 2241. Preferably, the material of the pixel electrode 225 is different from the material of the filling part 223.

The filling part 223 includes a first portion 2231 and a second portion 2232 connected to the first portion 2231. The first portion 2231 passes through the first via 2241 to electrically connect to the drain 221. The second portion 2232 is disposed on the planar layer 222 and covers the first via 2241. In the embodiment, the shape of the filling part 223 is "T". The material of the filling part 223 is metal or alloy. For example, the material of the filling part 223 is selected from one of Cu, W, Cr, Al and combination thereof.

In the embodiment, the touch panel 200 further includes a light shading layer 211. The light shading layer 211 is disposed on the surface of the substrate 210. The low-temperature poly-silicon layer 212 is disposed on the surface of the substrate 210 through the light shading layer 211, and the low-temperature poly-silicon layer 212 is disposed on a middle portion of the light shading layer 211. In the embodiment, the low-temperature poly-silicon layer 212, the first isolating layer 213, the first type heavy doping regions 214, the second isolating layer 216, the gate 217, the third isolating layer 218, the source 219 and the drain 221 are combined to form a low-temperature poly-silicon thin film transistor, and the light shading layer 211 is used to avoid a light leakage of the low-temperature poly-silicon thin film transistor on the touch panel 200.

In the embodiment, the touch panel 200 is a self capacitance touch panel, the touch panel 200 further includes touch signal lines 226. The touch signal lines 226 detect a touch action on the touch panel 200 and a location of the touch action, and transmit a signal corresponding to the touch action and the touch location to a chip, such that the chip performs an operation corresponding to the touch action and the location of the touch action. At least one of the touch signal lines 226 includes a first transparent guide wire 2261 and a metal wire 2262. The metal wire 2262 is disposed on the planar layer 222, and the metal wire 2262 is electrically connected to the first transparent guide wire 2261. The material of the first transparent guide wire 2261 is a transparent metal oxide and has conductivity. The first transparent guide wire 2261 may include one of Indium-Tin Oxide, Indium-Zinc Oxide, Indium Oxide, Zinc Oxide or any combination thereof. Comparing the conductively of the first transparent guide wire 2261 whose material is metal oxide with the conductively of the metal, the conductively of the first transparent guide wire 2261 is worse. Therefore, on the basis of maintaining the transparency, the signal lines is formed by electrically connecting the metal wire 2262 and the first transparent guide wire 2261 so as to increase their conductively.

The material of the filling part 223 is metal. The filling part 223 and the metal wire 2262 are formed at the same. On the other hand, the filling part 223 and the metal wire 2262 are formed in the same process so as to save the manufacturing procedure of the touch panel 200. The filling part 223 and the metal wire 2262 may be formed in the following manner. First, a metal layer is disposed on the planar layer 222, and then the metal layer is patterned to form the filling part 223 and the metal wire 2262.

The touch panel 200 further includes first type light doping regions 215. The first type light doping regions 215 are disposed on the first isolating layer 213 and disposed between the two first type heavy doping regions 214. The first type light doping regions 215 are disposed between the two first type heavy doping regions 214 so as to decrease a leakage current of the low-temperature poly-silicon thin film transistor to increase the performance of the low-temperature poly-silicon thin film transistor. In the embodiment, the first type is P type. At this time, the first type heavy doping regions are P type heavy doping, and the first type light doping is P type light doping. It should be understood that in another embodiment, the first type is N type. At this time, the first type heavy doping regions are N type heavy doping, and the first type light doping is N type light doping.

In the embodiment, the substrate 210 may be a glass substrate. It should be understood that the substrate 210 may also be a plastic substrate or an isolating substrate in other embodiments. The material of the first isolating layer 213, the second isolating layer 216, the third isolating layer 218 and the fourth isolating layer 224 may be one of silicon oxide layer, silicon nitride layer, silicon oxynitride layer and combination thereof.

The surface of the substrate 210 further includes a buffer layer. The buffer layer is used to buffer a stress in the process of making the other structures of the touch panel 200 on the substrate 210 so as to avoid damaging or breaking the substrate 210. The material of the buffer layer is selected from one of silicon oxide layer, silicon nitride layer, silicon oxynitride layer and combination thereof. At this time, the light shading layer 211, the low-temperature poly-silicon layer 212, the first isolating layer 213 and other layers are disposed on the surface of the substrate 210 through the buffer layer.

The effects of the disclosure different from the current technique is that in the touch panel 200 of the disclosure, the first via 2221 is disposed on the planar layer 222, the filling part 223 is filled in the first via 2221, the filling part 223 is electrically connected to the drain 219, the second via 2241 is disposed on the fourth isolating layer 224, and the second via 2241 corresponds to the filling part 223. When the pixel electrode 225 is connected to the drain 221, the pixel electrode 225 is only electrically connected to the filling part 223 through the second via 2241. On the other hand, the first via 2221 is disposed on the planar layer 222 and the filling part 223 is filled in the first via 2221 so as to decrease a depth between the pixel electrode 225 and the drain 221, such that when the pixel electrode 225 is electrically connected to the drain 221. The pixel electrode 225 does not break line and drop out easily, thereby increasing a yield of the touch panel 200. Further, since the material of the filling part 223 is metal or alloy, the resistance is lower than the pixel electrode 225 of the transparent metal oxide. Therefore, compared to the pixel electrode directly connected to the drain in the current technique, the resistance between the pixel electrode 225 and the drain 221 is decreased when the pixel electrode 225 is connected to the drain 221 through the filling part 223 in the disclosure.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A touch panel, comprising:
   a substrate;
   a low-temperature poly-silicon layer, a first isolating layer, a gate and a second isolating layer, arranged in sequence and disposed on a surface of the substrate;
   a source and a drain, disposed on the second isolating layer, the source and the drain disposed separately and the source and the drain respectively connected to the low-temperature poly-silicon layer through a through hole;
   a planar layer, disposed on the source, the drain and the second isolating layer, the planar layer having a first via corresponding to the drain;
   a filling part, filling the first via and the filling part electrically connected to the drain;
   a third isolating layer, disposed on the planar layer, the third isolating layer having a second via corresponding to the filling part; and
   a pixel electrode, disposed on the third isolating layer and electrically connected to the filling part through the second via.

2. The touch panel according to claim 1, wherein the filling part comprises a first portion and a second portion connected to the first portion, the first portion passing through the first via to electrically connect to the drain, the second portion disposed on the planar layer and covering the first via.

3. The touch panel according to claim 1, wherein the touch panel further comprises a light shading layer; the light shading layer is disposed on the surface of the substrate; the low-temperature poly-silicon layer is disposed on the surface of the substrate through the light shading layer, and the low-temperature poly-silicon layer is disposed on a middle portion of the light shading layer.

4. The touch panel according to claim 1, wherein the touch panel further comprises touch receiving lines and touch emitting lines; the touch receiving lines receive a detecting signal to detect a touch action on the touch panel and a location of the touch action; the touch emitting lines transmit a signal corresponding to the touch action and the touch location to a chip; at least one of the touch receiving lines and the touch emitting lines comprises a first transparent guide wire and a metal wire; the metal wire is disposed on the planar layer; the metal wire is electrically connected to the first transparent guide wire.

5. The touch panel according to claim 4, wherein a material of the filling part is metal, and the filling part and the metal wire are formed at the same time.

6. A touch panel, comprising:
a substrate;
a low-temperature poly-silicon layer and a first isolating layer, arranged in sequence and disposed on a surface of the substrate;
two first type heavy doping regions, disposed on the first isolating layer, and the two first type heavy doping regions disposed separately;
a second isolating layer, disposed on the first type heavy doping regions;
a gate and a third isolating layer, arranged in sequence and disposed on the second isolating layer;
a source and a drain, disposed on the third isolating layer, the source and the drain disposed separately and the source and the drain respectively connected to the first type heavy doping regions through a through hole;
a planar layer, disposed on the source, the drain and the third isolating layer, the planar layer having a first via corresponding to the drain;
a filling part, filling the first via and the filling part electrically connected to the drain;
a fourth isolating layer, disposed on the planar layer, the fourth isolating layer having a second via corresponding to the filling part; and
a pixel electrode, disposed on the fourth isolating layer and electrically connected to the filling part through the second via.

7. The touch panel according to claim 6, wherein the filling part comprises a first portion and a second portion connected to the first portion, the first portion passing through the first via to electrically connect to the drain, the second portion disposed on the planar layer and covering the first via.

8. The touch panel according to claim 6, wherein the touch panel further comprises a light shading layer; the light shading layer is disposed on the surface of the substrate; the low-temperature poly-silicon layer is disposed on the surface of the substrate through the light shading layer, and the low-temperature poly-silicon layer is disposed on a middle portion of the light shading layer.

9. The touch panel according to claim 6, wherein the touch panel further comprises touch signal lines; the touch signal lines detect a touch action on the touch panel and a location of the touch action; the touch signal lines transmit a signal corresponding to the touch action and the touch location to a chip; at least one of the touch signal lines comprises a first transparent guide wire and a metal wire; the metal wire is disposed on the planar layer; the metal wire is electrically connected to the first transparent guide wire.

10. The touch panel according to claim 9, wherein a material of the filling part is metal, and the filling part and the metal wire are formed at the same time.

11. The touch panel according to claim 6, wherein the touch panel further comprises first type light doping regions; the first type light doping regions are disposed on the first isolating layer and disposed between the two first type heavy doping regions.

* * * * *